(12) United States Patent
Young et al.

(10) Patent No.: US 10,678,975 B2
(45) Date of Patent: Jun. 9, 2020

(54) CODE MODULE SELECTION FOR DEVICE DESIGN

(71) Applicant: Amazon Technologies, Inc., Seattle, WA (US)

(72) Inventors: Richard David Young, Seattle, WA (US); Shyam Krishnamoorthy, Redmond, WA (US); Robert P. Cochran, Seattle, WA (US); Richard Barry, Mercer Island, WA (US)

(73) Assignee: Amazon Tecnnologies, Inc., Seattle, WA (US)

( * ) Notice: Subject to any disclaimer, the term of this patent is extended or adjusted under 35 U.S.C. 154(b) by 40 days.

(21) Appl. No.: 15/805,875

(22) Filed: Nov. 7, 2017

(65) Prior Publication Data

US 2019/0138678 A1 May 9, 2019

(51) Int. Cl.
| | |
|---|---|
| *G06F 8/30* | (2018.01) |
| *G06F 30/30* | (2020.01) |
| *G06F 8/33* | (2018.01) |
| *G06F 8/36* | (2018.01) |
| *G06F 17/50* | (2006.01) |
| *G06F 8/34* | (2018.01) |
| *G06F 111/20* | (2020.01) |

(52) U.S. Cl.
CPC ............ *G06F 30/30* (2020.01); *G06F 8/33* (2013.01); *G06F 8/36* (2013.01); *G06F 8/34* (2013.01); *G06F 2111/20* (2020.01)

(58) Field of Classification Search
USPC .................................................. 716/101, 102
See application file for complete search history.

(56) References Cited

U.S. PATENT DOCUMENTS

| | | | | |
|---|---|---|---|---|
| 6,968,286 | B1 * | 11/2005 | Watkins ............... | G06F 11/263 702/124 |
| 7,075,670 | B1 * | 7/2006 | Koga .................... | G06F 3/1204 358/1.15 |
| 8,214,548 | B2 * | 7/2012 | Sekine et al. ......... | G06F 3/1285 710/15 |
| 8,589,866 | B2 * | 11/2013 | Sekine et al. ......... | G06F 9/4411 717/106 |
| 8,732,588 | B2 * | 5/2014 | Klawitter et al. ...... | G06F 9/452 715/748 |
| 9,055,120 | B1 * | 6/2015 | Firman ................. | G06F 16/951 |
| 9,397,885 | B2 * | 7/2016 | Friedman et al. ...... | H04L 41/08 |
| 9,465,658 | B1 * | 10/2016 | Shashi ................. | G06F 9/4881 |
| 9,529,950 | B1 * | 12/2016 | Sadooghi-Alvandi et al. ............ G06F 17/5045 |
| 9,753,712 | B2 * | 9/2017 | Amiga et al. ............. | G06F 8/71 |
| 9,859,255 | B1 * | 1/2018 | Yoon et al. ........... | H01L 21/565 |
| 9,882,775 | B1 * | 1/2018 | Allen .................. | H04L 41/0813 |

(Continued)

*Primary Examiner* — Sun J Lin
(74) *Attorney, Agent, or Firm* — Thorpe North & Western, LLP.

(57) ABSTRACT

Technology is described for providing code modules for building a device. An indication of hardware components to be used when designing a device may be received. A use case for the device may be received. A list of code modules that are compatible with the hardware components may be provided. The list of code modules may be based on the use case for the device. A selection of code modules may be received from a list of code modules that are compatible with the hardware components. The code modules may be provided for use in designing the device.

20 Claims, 11 Drawing Sheets

(56) References Cited

U.S. PATENT DOCUMENTS

| | | | |
|---|---|---|---|
| 9,900,369 B2* | 2/2018 | Afzal | H04L 67/02 |
| 2002/0188434 A1 | 12/2002 | Shulman et al. | |
| 2006/0230383 A1 | 10/2006 | Moulckers et al. | |
| 2009/0241104 A1* | 9/2009 | Amiga et al. | G06F 8/71 |
| | | | 717/174 |
| 2011/0252163 A1 | 10/2011 | Villar et al. | |
| 2014/0068551 A1 | 3/2014 | Swaminathan et al. | |
| 2018/0212839 A1* | 7/2018 | Hiers et al. | H04L 41/12 |

\* cited by examiner

CODE MODULE SELECTION FOR DEVICE DESIGN

BACKGROUND

Electronic devices and computing systems have become ever-present in many aspects of society. Devices may be found in the workplace, at home, or at school. Computing systems may include computing and data storage systems to process and store data. Some computing systems have begun offering centralized, virtual computing options known as service provider environments that may reduce overall costs, improve availability, improve scalability, and reduce time to deploy new applications.

Advancements in communication technologies have allowed even relatively simple electronic devices to communicate with other devices and computing systems over a computer network. For example, the Internet of Things (IoT) is the interconnection of computing devices scattered across the globe using the existing Internet infrastructure. Such devices may be able to capture data, and then the devices may securely communicate the data over a network to a centralized computing service (e.g., a service provider environment).

Electronic devices (e.g., IoT devices or embedded devices) may be included in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, software, sensors, and network connectivity that enables these physical devices to collect and send data. Electronic devices (e.g., IoT devices, etc.) may be useful for a number of applications, such as environmental monitoring, farming, infrastructure management, industrial applications, building and home automation, energy management, medical and healthcare systems, transport systems, etc.

DETAILED DESCRIPTION

Figure 1A:
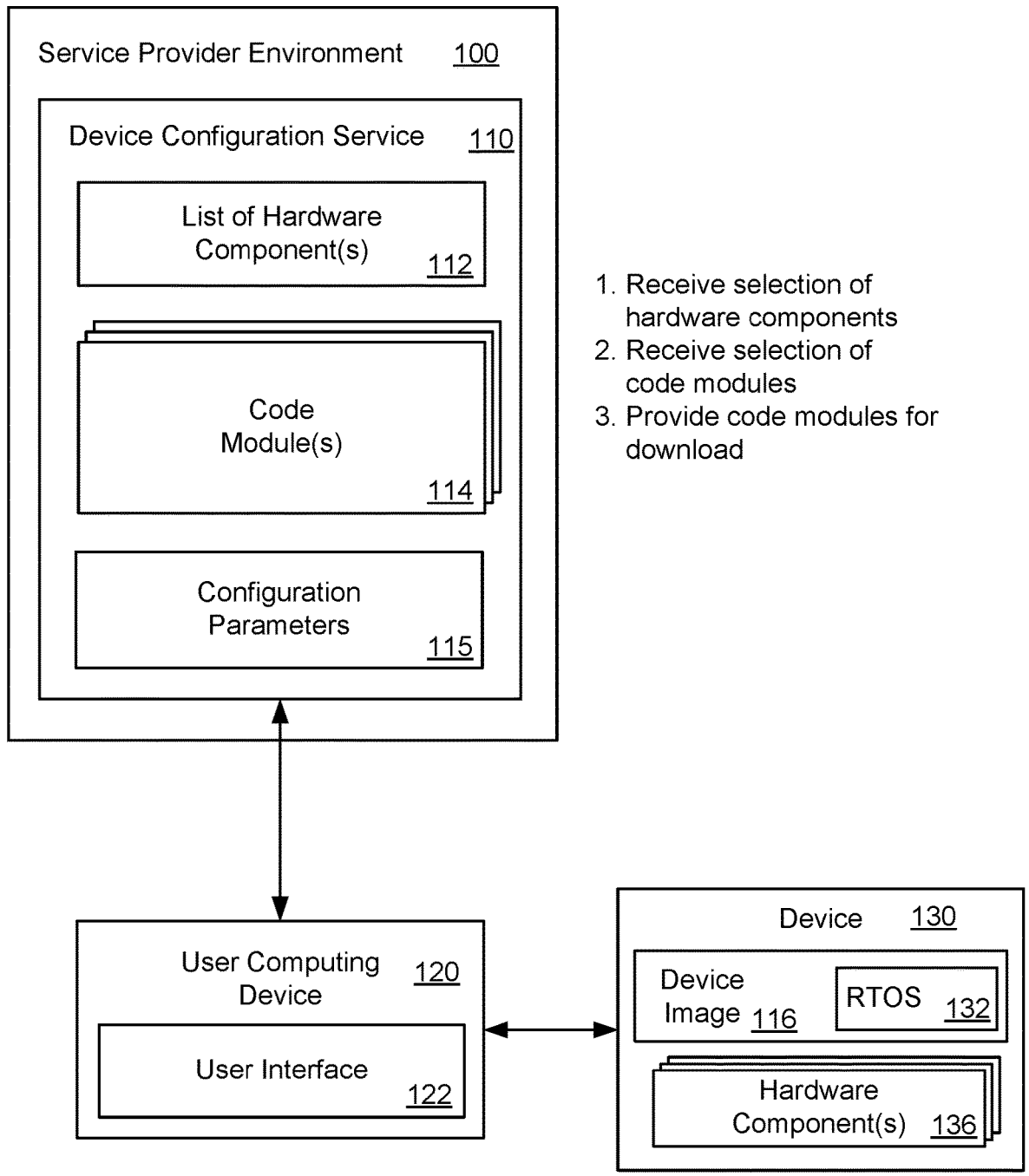
FIG. 1A illustrates a system and related operations for providing code modules for designing a device according to an example of the present technology.

A technology is described for providing code modules for devices, such as IoT devices. The code modules may be selected for a device during a design process for the device. The code modules (e.g., software modules, program modules, function modules, executables) may correspond to hardware components to be included in the device. After selection, the code modules may be sent to the device (e.g., in a device image) and installed on the device. The code modules may enable the hardware components included in the device to function correctly. In one example, the code modules may enable the hardware components in the device to interface correctly with a real-time operation system (RTOS) or another type of embedded operating system that executes on the device.

In one configuration, the device configuration service may determine hardware components to be included in the device image from a list of hardware components, and the hardware components may be included in a device that is being designed. Each hardware component that is available to the device configuration service may be certified and given prior approval by an approval authority (e.g., a computing service provider), and hardware components that are uncertified may not be selectable by the device configuration service. A certified hardware component may be certified as having an appropriate code module which is loadable from the device configuration service. The hardware components may include microcontrollers, digital signal processing (DSP) chips, sensors, transceivers, cameras, microphones, speakers, etc. In one example, the device configuration service may provide the list of hardware components via a user interface accessible via the service provider environment that enables a user to select the hardware components to be included in the device. Accordingly, the device configuration service may be used to determine the hardware components based on a user selection received via the user interface.

Alternatively, the device configuration service may receive a device capability definition for the device via the user interface, and the device capability definition may describe a use case for the device. The use case for the device may be a thermostat, a rainfall sensor, video streaming, image capturing, motion sensing, etc. Based on the device capability definition, the device configuration service may recommend hardware components to be included in the device (e.g., video encoder, high definition (HD) camera, temperature sensor, etc.).

In one configuration, the device configuration service may provide a list of code modules that are compatible with selected hardware components. The list of code modules may be generated based on the device capability definition. The list of code modules may be provided via the user interface that enables the user to select the code modules. Each code module that is available to the device configuration service may be certified as being compatible with a particular hardware component. Further, a particular certified code module may be compatible with an individual hardware component, and may not be compatible with hardware components with the same functionality which are different (e.g., hardware components of another model type or another manufacturer). The code modules may include microcontroller modules, digital signal processing (DSP) modules, sensor modules, transceiver modules, camera modules, microphone modules, speaker modules, etc. The code modules may include firmware, device drivers, executable code, libraries, configuration files, etc. In an alternative configuration, the device configuration service may automatically detect code modules based on the selected hardware components.

In one configuration, the device configuration service may provide selected certified code modules for download on the device. For example, the device configuration service may provide the code modules to a user computing device. The user computing device may assemble the code modules to generate a device image, which may be installed on the device. The device image may be a computer file or image that includes the code modules (which correspond to the hardware components that are included in the device). The installation of the device image may provide the device with device functionalities which correspond with the device hardware, such as an ability to connect to a service (e.g., wireless networking functionality to connect to an IoT service) running in the service provider environment. Alternatively, the installation of the device image may enable the device to connect to a computing hub in a local wireless network, and the computing hub may be connected to the service running in the service provider environment.

FIG. 1A illustrates an exemplary system and related operations for providing code modules 114 for designing a device 130 (e.g., an IoT device). The code modules 114 may be provided from a device configuration service 110 that operates in a service provider environment 100. The device configuration service 110 may provide a platform for designing and configuring devices 130 using hardware components 136 and the code modules 114 (e.g., software modules, program modules, function modules, executable modules) as selectable elements of the design process. The device configuration service 110 may be in communication with a user computing device 120 in order to present a user interface 122 (e.g., a device configuration user interface in a browser based interface) as received from the device configuration service 110. Alternatively, the device configuration service 110 may be in communication with an application loaded on the user computing device 120, and the application may present the user interface 122 as received from the device configuration service 110.

The device configuration service 110 may provide the code modules 114 for the device 130 based on input received from the user computing device 120 via the user interface 122. The user computing device 120 may be connected to the device 130 via a wired or a wireless connection. The device 130 may be configured to execute a real-time operating system (RTOS) 132 (e.g., Free RTOS) or another type of embedded operation system. The RTOS 132 may manage hardware resources, host applications and process incoming data in real-time with reduced buffer delays. In addition, the device 130 may include hardware components 136 that may be configured based on the code modules 114 received from the device configuration service 110, and the code modules 114 may be compatible with the RTOS 132 that runs on the device 130.

In one configuration, the device configuration service 110 may provide a list of hardware components 112 that are available when designing and building the device 130. The device configuration service 110 may provide the list of hardware components 112 to the user computing device 120 via the user interface 122. The list of hardware components 112 may include various types of microcontrollers, sensors, transceivers, cameras, microphones, speakers, I/O interfaces (e.g., a USB controller), device peripherals, etc. that are available when designing and building the device 130.

In one example, the device configuration service 110 may filter the list of hardware components 112 based on criteria (e.g., key word searches or device types) received via the user interface 122. For example, the device configuration service 110 may provide a list of hardware components, such as: microcontrollers with defined memory and/or processor capabilities, certain types of sensors (e.g., ambient light sensors), or types of cameras that capture high-definition (HD) images of a certain resolution, etc. based on feedback received via the user interface 122. The device configuration service 110 may provide the list of hardware components 112 in a defined format (e.g., a table format or listing format) that enables a user to compare various types of hardware components 136.

In one example, the configuration service 110 may filter the list of hardware components 112 based on a use case of the device as specified by a device capability definition. For example, the user may define the device capability definition of the device 130 via the user interface 122, and the device capability definition may correspond to an intended use case of the device 130 that is being designed and built. The list of hardware components 112 that are presented to the user interface 122 may be filtered accordingly based on the device capability definition.

Alternatively, the device configuration service 110 may not filter the list of hardware components 112 that are presented to the user computing device 120 via the user interface 122. In other words, the device configuration service 110 may provide a list of all hardware components 112 that are supported by the device configuration service 110.

In one example, the device configuration service 110 may receive a selection of hardware components 136 from the list of hardware components 112. The device configuration service 110 may receive the selection from the user computing device 120 via the user interface 122. The selected hardware components 136 may indicate the hardware components 136 which are expected to be used or the hardware components which are being used to build the device 130.

In one example, the selected hardware components 136 may correspond to the use case of the device 130, as specified by the device capability definition. In other words, depending on a purpose or objective of the device 130 (e.g., video streaming, factory monitoring), as indicated in the device capability definition, appropriate hardware components 136 (e.g., hardware encoders for encoding video, temperature sensors, ambient light sensors) may be selected or identified for the device 130 via the user interface 122. Therefore, the user may select the appropriate hardware components 136 depending on the type of device 130 being designed and built.

In one example, the device configuration service 110 may provide a list of code modules 114 that are compatible with the selected hardware components 136. Based on the selection of the hardware components 136, the device configuration service 110 may identify code modules 114 that correspond to the selected hardware components 136 for the device 130. The device configuration service 110 may provide the list of code modules 114 to the user computing device 120 for presentation via the user interface 122. The code modules 114 may include microcontroller modules, sensor modules, transceiver modules, wireless communication modules (e.g., Bluetooth and Wi-Fi), messaging modules (e.g., message queue telemetry transport (MQTT), transmission control protocol and internet protocol (TCP/IP), hypertext transfer protocol (HTTP)) camera modules, microphone modules, speaker modules, etc. The code modules 114 may include firmware, device drivers, executable code, libraries, configuration files, an operation system, etc. Each code module 114 may be linked to a corresponding hardware component 136 (e.g., there may be one or more code modules 114 usable with a particular hardware component 136), and the code module 114 may configure the corresponding hardware component 136 to operate in the device 130. The device configuration service 110 may ensure that the code modules 114 provided for presentation via the user interface 122 are compatible with each other.

In one example, the list of code modules 114 that are provided to the user computing device 120 via the user interface 122 may depend on the use case of the device 130, as indicated in the device capability definition. For example, the list of code modules 114 may be filtered based on the use case of the device 130. In addition, the device configuration service 110 may provide contextual information for the code modules 114. For example, the device configuration service 110 may provide information on an amount of memory used on a chipset for each of the code modules 114. This may allow a designer to determine whether a code module 114 may fit within the constraints of a device image size. In one example, the device configuration service 110 may create a revision control system repository (such as a Git repository) for a user that includes code modules 114 utilized by the user, and the revision control system repository may be cloned or duplicated to allow the code modules 114 included in the revision control system repository to be accessible to other users.

In one example, the device configuration service 110 may receive a selection of code modules 114 from the list of code modules 114. In addition, the device configuration service 110 may identify a set of configuration parameters 115 for the selected code modules 114 based on the use case of the device 130. For example, based on the use case as specified by the device capability definition, the device configuration service 110 may recommend certain configuration parameters 115 for the selected code modules 114. The recommended configuration parameters 115 may be associated with the particular hardware components 136 and code modules 114 selected for the device 130. The configuration service 110 may receive a selection of certain configuration parameters 115 from the user computing device 120 via the user interface 122. Therefore, rather than simply selecting the code modules 114 for the device 130, the code modules 114 may be configured with certain configuration parameters 115 depending on the use case of the device 130.

As an example, a customer may provide to the device configuration service 110 generalized specifications for a network connected thermostat device configured to communicate with an application hosted in the service provider environment 100. The specifications provided by the customer may be used to identify the hardware components 136 that may be used for the network connected thermostat device, such as a microcontroller and the RTOS 132 that is compatible with the microcontroller, along with a temperature sensor and a networking device.

In one example, the device configuration service 110 may provide the code modules 114 and the configuration parameters 115 to the user computing device 120. A developer who is using the user computer device 120 may provide additional custom code for the device 130 and the custom code may be added to the code modules 114 and the configuration parameters 115. Then, the user computing device 120 may assemble the selected code modules 114 with the selected configuration parameters 115 to generate a device image 116. The user computing device 120 may assemble (e.g., compile, link, or combine) the selected code modules 114 and the selected configuration parameters 115 to generate the device image 116 using an integrated development environment (IDE) running on the user computing device 120. The device image 116 may be a computer file (e.g., a digital image, an install image, or compressed file, such as a ZIP file or a group of files) with the selected code modules 114 and configuration parameters 115. After assembly or compilation, the device image 116 may be transmitted from the user computing device 120 to the device 130 via a wired or wireless connection. The device image 116 may be utilized to install the software components and configure the selected hardware components 136 in the device 130. For example, based on the device image 116, the hardware components 136 may be configured to interface with the RTOS 132 running on the device 130. The device image 116 may be a base build package or install package to provide core functionality for the hardware components 136 and the RTOS 132 running on the device 130. Therefore, after the device image 116 is loaded onto the device 130, the IDE running on the user computing device 120 may be utilized to develop additional custom code that is linked to specific functions or operations to be performed by the device 130.

In one example, the device configuration service 110 may determine a selectable configuration for the device 130 on a chipset basis. Depending on the hardware components 136 selected for the device 130, the device configuration service 110 may select appropriate software for making the hardware components 136 operable in the device 130. The device configuration service 110 may provide a fully modular downloadable software stack, in which appropriate software is composed for the hardware components 136 on demand.

In one example, the IDE running on the user computing device 120 may be utilized to develop or incorporate additional code modules that have not been certified by the device configuration service 110. In this example, the IDE may be utilized to create (i.e., enable programming of) shim layers for the additional code modules, which may cause the additional code modules to be compatible with the RTOS running on the device 130.

In addition, the device configuration service 110 may provide an open source platform for submitting code modules, which may then be tested and certified. These code modules may be tested against existing code modules provided by the device configuration service 110 (e.g., interfaces of newly created shims may be tested by the device configuration service 110). After becoming certified, these code modules may be made available by the device configuration service 110 to other customers that are designing and building devices 130.

Figure 1B:
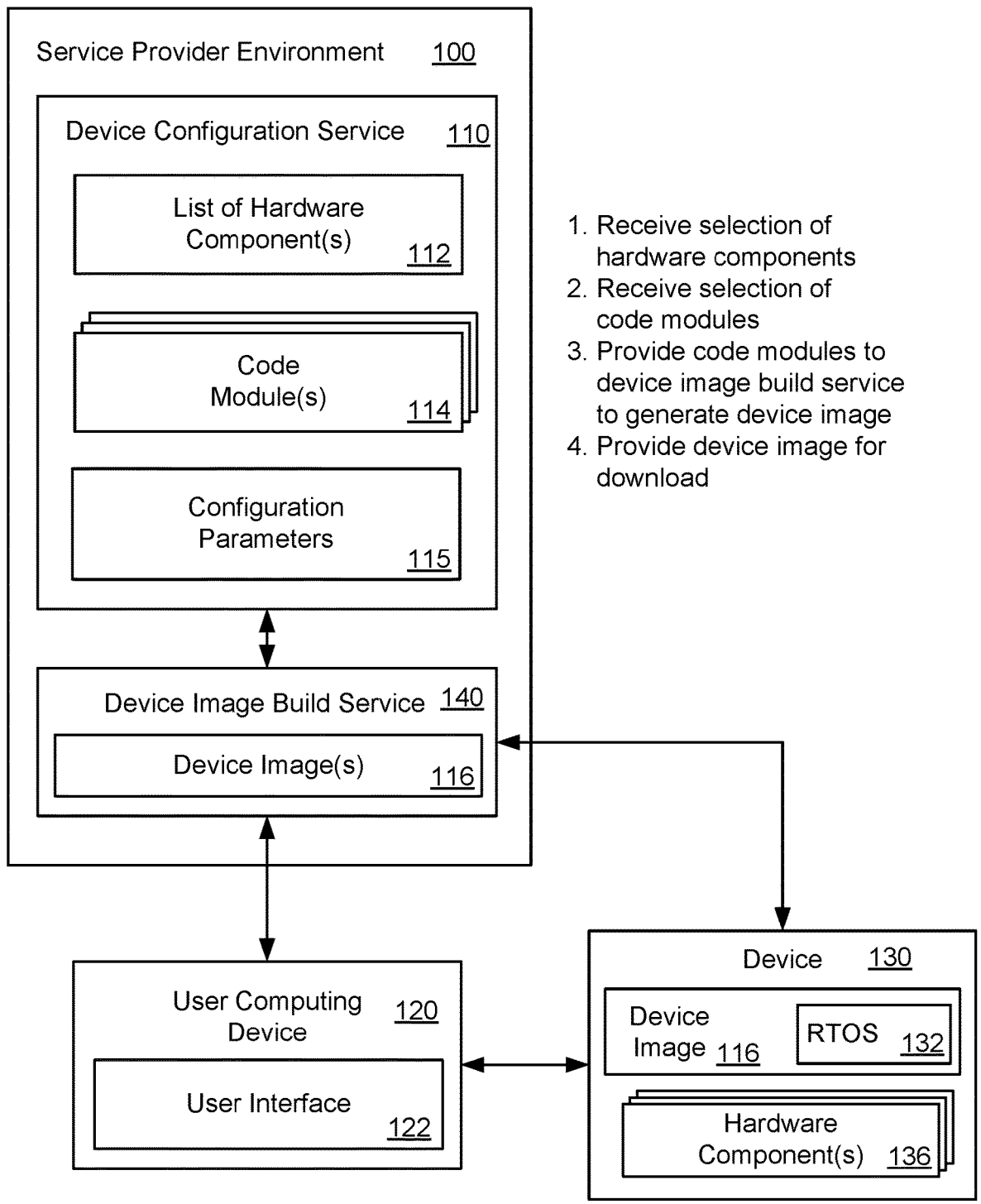
FIG. 1B illustrates a system and related operations for providing device images for designing a device via a device image build service in a service provider environment according to an example of the present technology.

FIG. 1B illustrates an exemplary system and related operations for providing device images 116 for building a device 130 via a device image build service 140 in a service provider environment 100. For example, a device configuration service 110 may receive a selection of hardware components from a list of hardware components 112. The device configuration service 110 may receive a selection of code modules 114 and configuration parameters 115. The code modules 114 and the configuration parameters 115 may be provided to the device image build service 140, which may generate a device image 116. The device image 142 may be provided to a user computing device 120. The user computing device 120 may send the device image 116 to the device 130, and the device image 116 may be installed on the device 130. Alternatively, the device image 142 may be provided directly from the device image build service 140 to the device 130.

In past solutions, device developers (e.g., IoT device developers) could spend an undue amount of time designing and building devices and the software layers for operating the devices. For example, device developers may typically spend 3-6 months writing code for chipset(s) to be used in a device. The device developers may have to consult individual hardware specification documents depending on which hardware components were being implemented in the device. The device developers may then spend additional time ensuring compatibility between various hardware components when designing and building the device. In general, the device developers would spend an undue amount of time to obtain basic functionality (e.g., memory allocation, CPU scheduling, base peripherals (e.g., USB, camera, etc.)), which did not include time spent for developing custom functions depending on the purpose or objective of the device. As a result, in past solutions, device development was cumbersome and involved an increased amount of time and resources.

In addition, in past solutions, the code for the chipset(s) used in the device would have to be manually rewritten when different hardware components were used in new versions of the device. For example, when a hardware component vendor was changed and different hardware components were to be used in a new version of the device as a result (even if a functionality of the device remained the same between the versions of the device), the code in the device would have to be manually rewritten to be adapted to the new hardware components, which would make the device development process overly cumbersome.

In the present technology, the device configuration service or the device developers may select from a list of hardware components. The hardware components may be previously approved by the device configuration service. The device configuration service or the device developers may select from a list of code modules that are compatible with the hardware components, and the list of code modules may be tailored to the use case for the device. For example, the device developers may select, via a user interface, the code modules depending on compatibility with selected hardware components and the use case of the device that is being developed. Each code module may include code that is linked to a particular hardware component. After the code modules have been selected, the device image may be generated to include the code modules, and then the device image may be downloaded and installed on the device. Therefore, the device developer may avoid manually writing the code for each hardware component in the device. Rather, the device developer may select hardware components from a list of approved hardware components, and then automatically obtain the code modules that correspond to these hardware components. As a result, the device development process may be simplified and involve a reduced amount of time.

Figure 2:
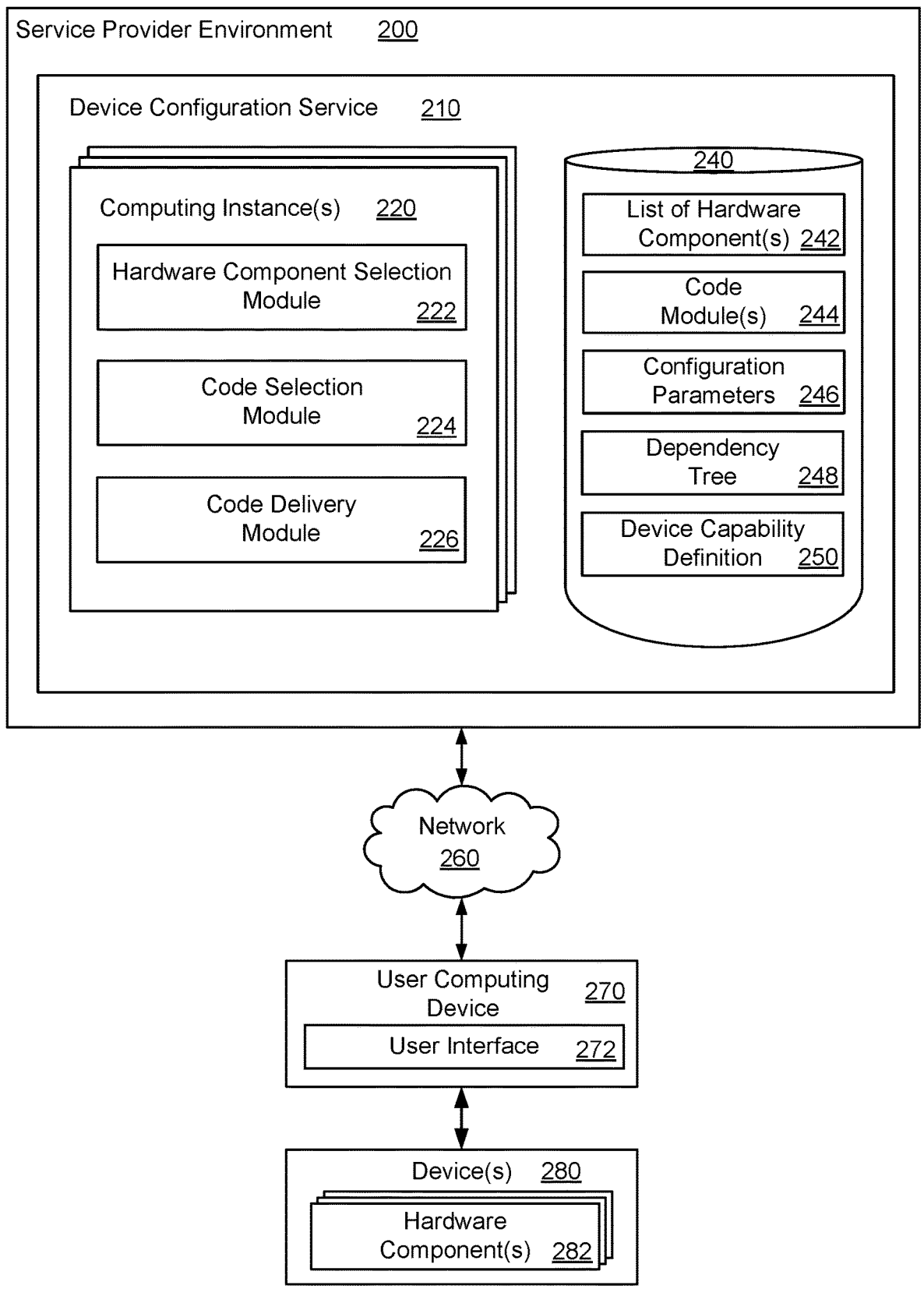
FIG. 2 is an illustration of a networked system for providing code modules for designing a device according to an example of the present technology.

FIG. 2 illustrates example components of the present technology in a service provider environment 200. The service provider environment 200 may operate a device configuration service 210. The device configuration service 210 may utilize one or more computing instances 220 and data store(s) 240 for providing code modules 244 for a device 280 (e.g., an IoT device). The device configuration service 210 may provide the code modules 244 for download and installation on the device 280 via a user computing device 270. The device configuration service 210 may be in communication with the user computing device 270 over a network 260. The user computing device 270 may include a user interface 272 that enables a user to select various code modules 244 and configuration parameters 246 for use on the device 280.

In one example, the data store 240 may include a list of hardware components 242. The list of hardware components 242 may include hardware components 282 that are provided by the device configuration service 210, and these hardware components 282 may be used when designing and building devices 280. For example, the hardware components 282 may include hardware components for which corresponding code modules have already been tested and certified by the device configuration service 210. The list of hardware components 242 may not include hardware components for which corresponding code modules have not been tested and certified by the device configuration service 210. The list of hardware components 242 may include various classes of hardware components 282 that may be used when designing the device 280. For example, the list of hardware components 242 may include wireless communication components, such as Wi-Fi chipsets, ultra-low power Wi-Fi chipsets, Bluetooth chipsets, Bluetooth Low Energy (BLE) chipsets, ZigBee chipsets or Long Term Evolution (LTE) chipsets. The list of hardware components 242 may include various types of embedded microcontrollers and systems on chips (SoC) with varying levels of processing and memory capabilities. The list of hardware components 242 may include various types of sensors, such as temperature sensors, proximity sensors, position sensors, light sensors, moisture/humidity sensors, motion sensors, acceleration and orientation sensors, microphones, chemical/gas sensors, etc. The list of hardware components 242 may include various types of cameras and video recorders. In addition, the list of hardware components 242 may include various types of display screens, speaker systems, power units (e.g., batteries) and other hardware components 242 that may be included in devices 280.

In one example, the data store 240 may include code modules 244 (e.g., software modules, program modules, function modules, executables). The code modules 244 may be provided by the device configuration service 210 and the code modules 244 may correspond to hardware components 282 that are available for designing and building the devices 280. The code modules 244 may be modular software components to be installed on the devices 280. A code module 244 may correspond to a particular type and/or model of a hardware component 282. The code module 244 may include firmware, device drivers, executable code, libraries, configuration files, etc. The code modules 244 may be installed or copied on to the device 280 to enable corresponding hardware components 282 to function correctly in the device 280. The code modules 244 may include wireless communication modules (e.g., Bluetooth modules or Wi-Fi modules), messaging modules to enable support of messaging protocols (e.g., MQTT, TCP/IP or HTTP), microcontroller modules, sensor modules, camera modules, video recorder modules, display screen modules, speaker system modules, power management modules, or other types of software that enable functionality of hardware components 282 (e.g., base hardware or hardware peripherals) that may be included in devices 280.

In one example, the data store 240 may include configuration parameters 246. The configuration parameters 246 may be associated with the code modules 244. For example, the configuration parameters 246 may include various settings, parameters, configurations, variables, etc. that are defined in the code modules 244. The configuration parameters 246 may be defined based on a device capability definition 250 for the device 280. Accordingly, the configuration parameters 246 may be defined based on a use case of the device 280. In one example, the device configuration service 210 may provide a series of questions to the user computing device 270 via the user interface 272, and the configuration parameters 246 for the code modules 244 may be selected or configured based on user input received from the user computing device 270. As an example, the configuration parameters 246 for the code modules 244 may depend on whether the corresponding hardware components 282 in the device 280 are used to support temperature sensing, video streaming, farm machinery, etc.

In one example, the data store 240 may include a dependency tree 248. The dependency tree 248 may map a plurality of code modules 244 to a plurality of hardware components 282 that are compatible when designing the device 280. The dependency tree 248 may also indicate which code modules 244 are compatible with a defined hardware component 282. In addition, the dependency tree 248 may indicate which code modules 244 are compatible with or depend on other code modules 244. This may indicate which code modules 244 have multiple dependencies in order to operate on the device 280. An absence of dependency links between particular code modules 244 in the dependency tree 248 may indicate that those particular code modules 244 are not compatible with each other. Therefore, the code modules 244 may not be selected for inclusion in the device image 248 in accordance with the dependency tree 248.

As a non-limiting example, the dependency tree 248 may indicate that a microcontroller is compatible with a certain Bluetooth chipset and a certain sensor, and therefore, a microcontroller code module is compatible with a corresponding Bluetooth code module and sensor code module. The dependency tree 248 may also indicate that the Bluetooth module and the sensor module are compatible with each other. Alternatively, the dependency tree 248 may indicate that while the Bluetooth module and the sensor module are each compatible with the microcontroller code module, the Bluetooth module and the sensor module are not compatible with each other. Therefore, in this case, this particular Bluetooth chipset may not be used in combination with this particular sensor when designing the device 280.

In one example, the data store 240 may include the device capability definition 250. The device capability definition 250 may define device capabilities and the use case of the device 280. The device capability definition 250 of the device 280 may be received via the user interface 272 on the user computing device 270. The device capability definition 250 may define a use case, purpose, or objective associated with the device 280 (e.g., temperature capture, water sensing, intrusion detection, audio streaming, video streaming, image capturing). The device capability definition 250 may be defined based on user input received in response to a series of questions provided from the device configuration service 210 to the user computing device 270 via the user interface 272. The device capability definition 250 may define a location or type of setting (e.g., farm, factory, home) in which the device 280 will be used. The device capability definition 250 may define a type of data (e.g., temperature data, moisture data, motion data, and image data) to be collected and uploaded by the device 280, and the device capability definition 250 may define a periodicity for collecting and uploading the data. The device capability definition 250 may also define whether the device 280 functions within a group of similar devices 280 at a particular location.

The computing instance(s) 220 operated by the device configuration service 210 may utilize a number of modules for providing the code modules 244 for the device 280. The computing instance(s) 220 may include a hardware component selection module 222, a code selection module 224, a code delivery module 226, and other applications, services, processes, systems, engines, or functionality not discussed in detail.

The hardware component selection module 222 may be configured to identify hardware components 282 for the device 280 that is being designed. The hardware component selection module 222 may identify the hardware components 282 based on a selection received from the user computing device 270 via the user interface 272. For example, a user may provide the selection of the hardware components 282 to achieve an objective or use case of the device 280. Alternatively, the hardware component selection module 222 may recommend or automatically select certain hardware components 282 based on the device capability definition 250 and use case received from the user computing device 270 via the user interface 272.

The code selection module 224 may be configured to identify code modules 244 for the device 280 that is being designed. The code selection module 224 may automatically identify code modules 244 that are associated with the selected hardware components 282 for the device 280. Alternatively, the code selection module 224 may provide a list of code modules 244 that are compatible with the hardware components 282 already selected, and the code selection module 224 may identify specific code modules 244 based on user input received from the user computing device 270 via the user interface 272. The list of code modules 244 that is provided to the user computing device 270 may be tailored or filtered based on the use case of the device 280, as defined in the device capability definition 250. In addition, the code selection module 224 may select various configuration parameters 246 for the code modules 244 based on user input received from the user computing device 270 via the user interface 272. For example, the code selection module 224 may select the configuration parameters 246 to be tailored to the use case of the device 280, as defined in the device capability definition 250.

The code delivery module 226 may provide selected code modules 244 and selected configuration parameters 246 to the user computing device 270 via the network 260. The code delivery module 226 may provide the code modules 244 and the configuration parameters 246 to enable a developer using the user computing device 270 to design and generate a device image from the code modules 244 and the configuration parameters 246. Then the device image may be loaded onto the device 280.

The user computing device 270 with the user interface 272 may be, for example, a processor-based system. The user computing device 270 may include, but is not limited to, a desktop computer, laptop or notebook computer, tablet computer, handheld computer, workstation, network computer, or other devices with like capability.

The device 280 (e.g., an IoT device) may be, for example, processor-based systems or embedded systems. As non-limiting examples, the device 280 may include consumer products (e.g., rice cookers, televisions, printers, or scanners), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over the network 260. Commercial devices may also be included in the definition of the device 280, including: commercial printing presses, commercial freezers, commercial kilns, commercial mixers or other commercial equipment. The device 280 may be other types of embedded devices that provide electronic controls for a machine or system.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), a virtualized storage network, volatile or non-volatile RAM, optical media, or hard-drive type media. The data store may be representative of a plurality of data stores as can be appreciated.

The network 260 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
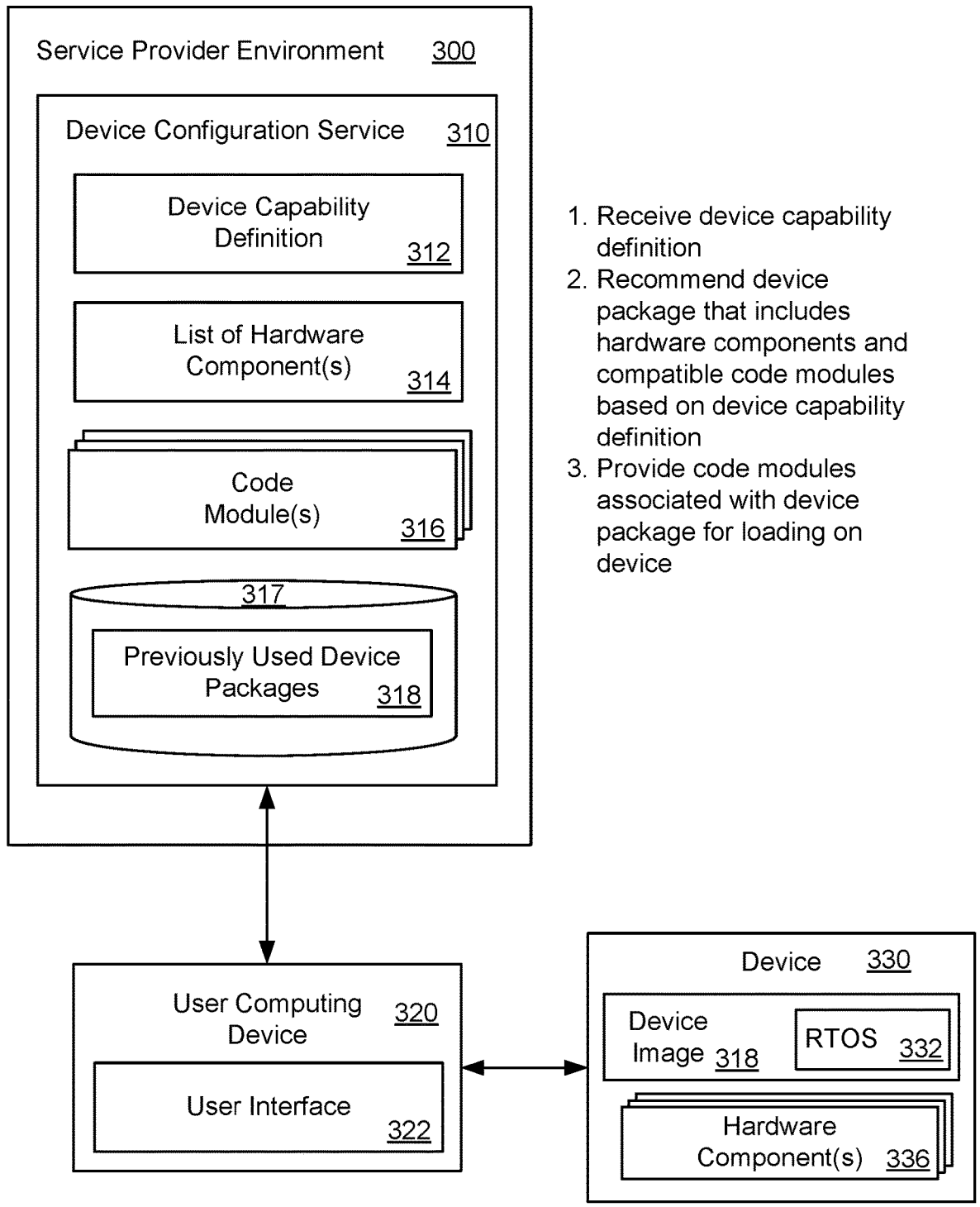
FIG. 3 illustrates a system and related operations for providing code modules for designing a device according to an example of the present technology.

FIG. 3 illustrates an exemplary system and related operations for providing code modules 316 for building a device 330 (e.g., an IoT device). The code modules 316 may be provided from a device configuration service 310 that operates in a service provider environment 300. The device configuration service 310 may be in communication with a user computing device 320 in order to present a user interface 322 (e.g., a device configuration user interface) as received from the device configuration service 310. Alternatively, the device configuration service 310 may be in communication with an application executing on the user computing device 320, and the application may present the user interface 322 as received from the device configuration service 310. The device configuration service 310 may provide the code modules 316 for the device 330 based on user input received from the user computing device 320 via the user interface 322.

In one example, the device configuration service 310 may receive a device capability definition 312 from the user computing device 320 via the user interface 322. The device capability definition 312 may define a use case of the device 330. For example, the device capability definition 312 may indicate that the device 330 is to be used for temperature sensing, video streaming, factory monitoring, etc.

Accordingly, the device configuration service 310 may recommend a device package that indicates hardware components 336 and compatible code modules 316 for designing and building the device 330. For example, the device configuration service 310 may identify the recommended device package based on accessing a data store 317 of previously used device packages 318. Other users may upload their device packages (which indicate previously used hardware components and code modules for a particular use case) to the data store 317, and this information may be accessible to the device configuration service 310. For example, the device configuration service 310 may create a revision control system repository (such as a Git repository) for a user that includes a previously used device package 318 (which may include code modules) utilized by the user, and the revision control system repository may be cloned or duplicated to allow the previously used device package 318 (which may include code modules) included in the revision control system repository to be accessible to other users. The device configuration service 310 may search for previously used device packages 318 that correspond to the use case for the device 330, as defined by the functionality in the device capability definition 312. When the device configuration service 310 identifies a previously used device package 318 in the data store 317 that matches or is similar to the use case for the device 330 (e.g., based on tags, fields, keywords, or other descriptors associated with the device packages), the device configuration service 310 may recommend a similar device package when designing and building the device 330. In other words, the device package that is recommended by the device configuration service 310 may indicate hardware components 336 and compatible code modules 316 that are tailored to the specific use case of the device 330. For example, these recommended hardware components 336 may consider processing and memory specifications for the device 330, sensor specifications for the device 330 (e.g., temperature sensors, motion detectors), wireless communication specifications for the device 330 (e.g., Bluetooth, Wi-Fi), messaging or networking specifications for the device 330 (e.g., MQTT, TCP/IP), etc. The device configuration service 310 may provide information on strengths and weaknesses of the hardware components 336 and the code modules 316 in view of the device capability definition 312.

In one example, the device configuration service 310 may select the device package to define recommended hardware components 336 based on an implementation definition specified by the user computing device 320. For example, the device configuration service 310 may select high-end hardware components 336 based on the implementation (e.g., hardware components with increased processing and memory capabilities), or alternatively, the device configuration service 310 may select low-end hardware components 336 based on the implementation (e.g., hardware components with reduced cost).

In one example, the device configuration service 310 may provide the recommended device package to the user computing device 320. The device configuration service 310 may have previously received a selection of the recommended device package from the user computing device 320 via the user interface 322. In this example, the device configuration service 310 may provide the code modules 316 associated with the device package for use on the device 330.

In an alternative example, the device configuration service 310 may receive a selection of the recommended device package from the user computing device 320 with a request for an alternate code module 316 that is not associated with the device package. In this example, the device configuration service 310 may provide the alternate code module 316 for use on the device 330. In other words, the user computing device 320 may accept the code modules 316 associated with the device package via the user interface 322, or alternatively, the user computing device 320 may modify some of the code modules associated with the device package via the user interface 322. Further, the user may not be limited to using every one of the hardware components 336 associated with a recommended device package. Rather, the user may use certain hardware components 336 that are indicated in the device package and select alternate hardware components 336 that are not included in the certain device package, such that the recommended device package may provide a starting point for designing and building the device 330.

Figure 4:
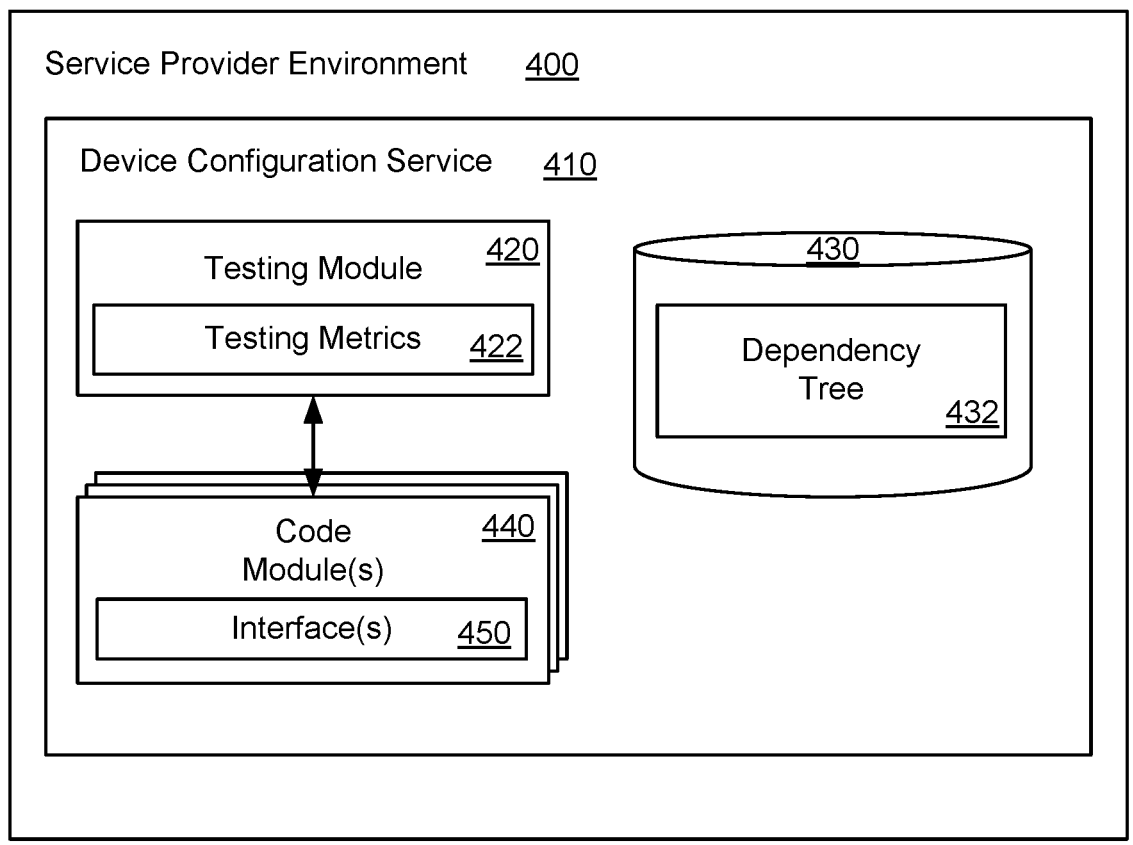
FIG. 4 illustrates a system and related operations for testing code modules according to an example of the present technology.

FIG. 4 illustrates an exemplary system and related operations for testing code modules 440. The code modules 440 may be tested using a testing module 420 in a device configuration service 410 that operates in a service provider environment 400. In one example, hundreds of code modules 440 may be selected and utilized by customers when designing and building devices. The code modules 440 may be mapped in a dependency tree 432 stored in a data store 430 of the device configuration service 410. The dependency tree 432 may map the dependencies between the code modules 440. As the number of code modules 440 grows over time, the complexity associated with testing the code modules 440 increases. Therefore, the code modules 440 may be tested using a testing matrix that reduces complexity while improving a likelihood that certain combinations of code modules 440 are functional. In one example, when the code modules 440 have been successfully tested by the testing module 420, these code modules 440 may be certified and made available by the device configuration service 410. As an increased number of code modules 440 are tested, the dependency tree 432 may include an increased number of code modules 440.

In one example, rather than testing each combination of code modules 440, the testing module 420 may test interfaces 450 between selected code modules 440 that depend on each other, as indicated in the dependency tree 432. The selected code modules 440 may be included in the plurality of code modules 440 that are available when designing and building the device. The interfaces 450 between the code modules 440 may be tested to ensure appropriate functionality between the code modules 440. In one alternative example, the testing module 420 may randomly sample interfaces 450 between the code modules 440, and the testing module 420 may rotate the sampling over time to ensure that an increased number of code module combinations are tested over time. The testing module 420 may generate testing metrics 422 based on testing of the code modules 440, which may indicate which code modules 440 are certified and which code modules 440 are uncertified.

As an example, a first code module (e.g., Ethernet driver, TCP/IP library, IP layer, MQTT layer) may have five dependencies (e.g., five other code modules that are dependent on the first code module) when used with a particular chipset. In this example, the testing module 420 may test an interface between the first code module and each of the five other code modules to ensure compatibility and usability between the first code module and each of the five dependent code modules. As another example, a first code module (e.g., a MQTT layer) may not directly call a second code module (e.g., an Ethernet driver). Rather the first code module (e.g., a MQTT layer) may call a third code module (e.g., a TCP/IP layer), but there may be other modules (e.g., the TCP/IP layer) that directly calls the second code module (e.g., the Ethernet driver). Therefore, the testing module 420 may test the interfaces between the modules that depend on each other (e.g., the first and third code modules, as well as the second and third code modules).

Figure 5:
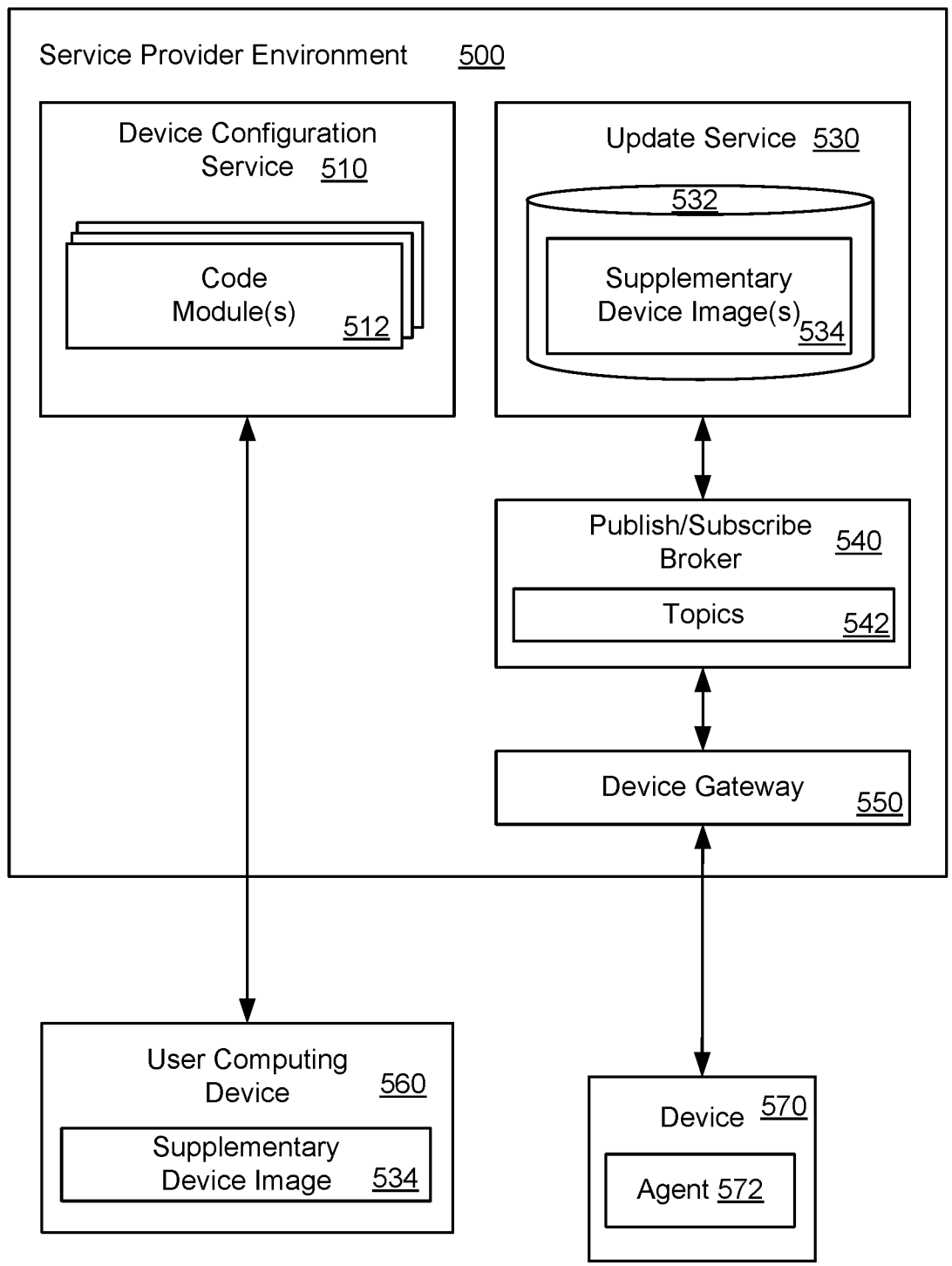
FIG. 5 illustrates a system and related operations for performing over-the-air (OTA) updates for supplementary device images according to an example of the present technology.

FIG. 5 illustrates an exemplary system and related operations for performing over-the-air (OTA) updates for supplementary device images 534. The OTA updates may be performed an update service 530 that operates in a service provider environment 500. The OTA update may involve providing the supplementary device image 534 stored in a data store 532 to an agent 572 on a device 570 (e.g., an IoT device), and the supplementary device image 534 may be installed on the device 570. The supplementary device image 534 may be provided to the device 570 via a publish/subscribe device image broker 540 in the service provider environment 500 and a device gateway 550 (which may be considered an entry point for the device 570 to access the service provider environment 500). For example, the device 570 may have a subscription to a topic 542 created by the publisher/subscriber device image broker 540, to which the update service 530 may publish supplementary device images 530 for delivery to the device 570.

In one example, a device configuration service 510 in the service provider environment 500 may receive a selection of code modules 512. The device configuration service 510 may receive the selection from the user computing device 560. The device configuration service 510 may provide the code modules to the user computing device 560. The user computing device 560 may assemble the code modules 512 to generate the supplementary device image 534. The supplementary device image 534 may provide new functionalities for the device 570 or augment an existing functionality of the device 570, or the supplementary device image 534 may fix existing problems in the device 570.

The user computing device 560 may upload the supplementary device image 534 to the data store 532 in the service provider environment 500. The update service 530 may securely deliver the supplementary device image 534 for use or installation on the device 570. The update service 530 may provide the supplementary device image 534 for download (or push transmission) by dividing the supplementary device image 534 into data blocks that are able to be received wirelessly by the device 570. The individual data blocks can be sent out as messages via the publish/subscribe broker 540. The supplementary device image 534 may be signed using a code signing certificate to ensure that the supplementary device image 534 is from a trustworthy source. The device 570 may receive the supplementary device image 534 which originates from the update service 530 and then may install the supplementary device image 534 to obtain the new functionalities, augment existing functionalities, fix problems, etc.

Figure 6:
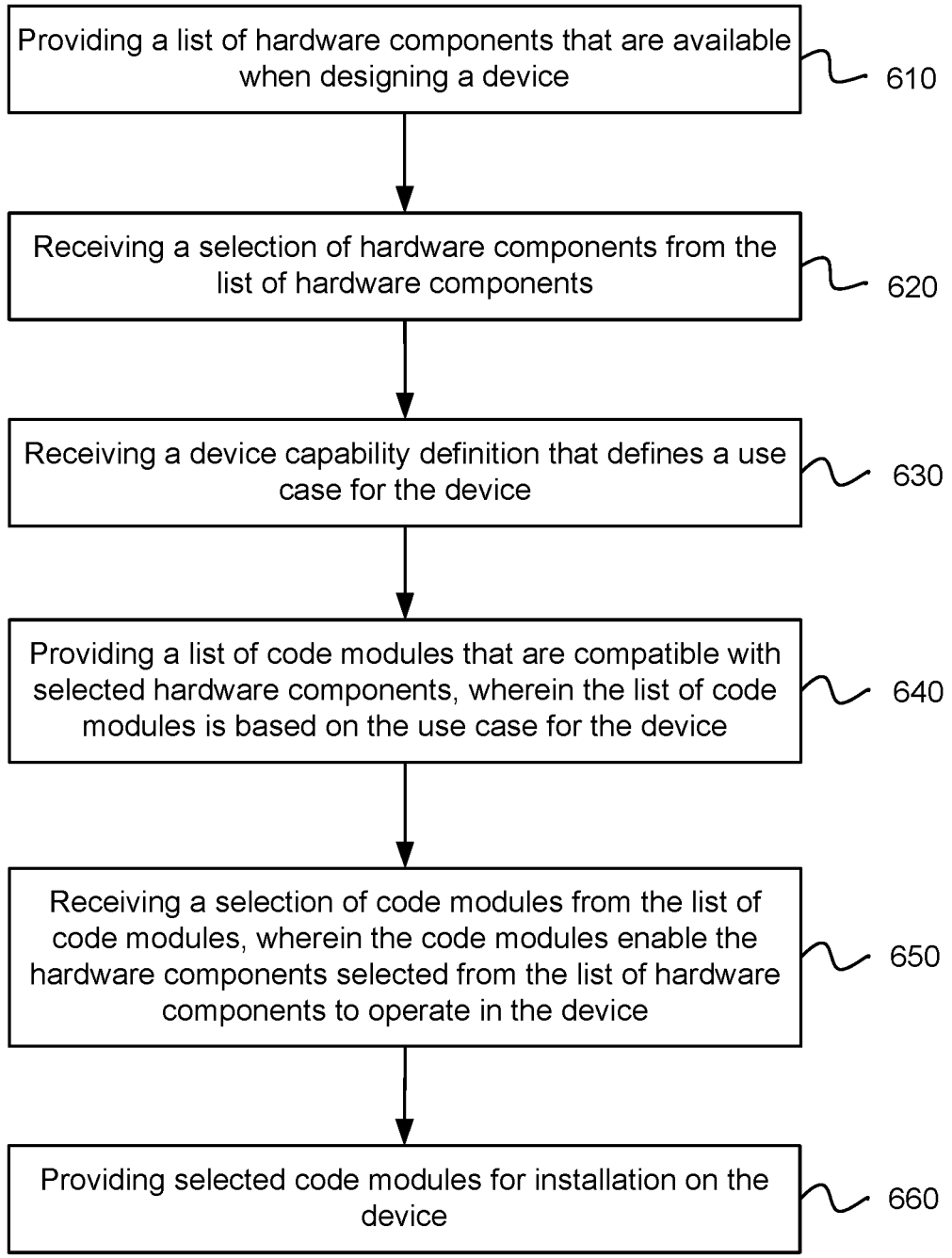
FIG. 6 is a flowchart of an example method for providing code modules.

FIG. 6 illustrates an example of a method for providing code modules for building devices (e.g., IoT devices). A list of hardware components that are available when designing a device may be provided, as in block 610. The list of hardware components may be received from a device configuration service that operates in a service provider environment. The hardware components included in the list of hardware components may have been previously certified by the device configuration service. The device configuration service may not provide hardware components that are not included in the list of hardware components.

A selection of hardware components from the list of hardware components may be received, as in block 620. The device configuration service may provide a user interface that enables the selection of hardware components from the list of hardware components. As an example, a user may select appropriate hardware components via the user interface for the device based on a device type (e.g., vacuum cleaner, smart home meter).

A device capability definition that defines a use case for the device may be received, as in block 630. The device capability definition may be received from the device configuration service that operates in the service provider environment. The device capability information may be received from a user computing device. The device capability definition may describe an intended purpose or objective of the device to be built.

A list of code modules that are compatible with selected hardware components may be provided, as in block 640. The list of certificated code modules may be filtered based on the use case for the device, as indicated in the device capability definition. In addition, the certificated code modules on the list may be compatible with the hardware components that were previously selected via the user interface. The code modules may include firmware, device drivers, executable code, libraries, configuration files, etc.

A selection of code modules from the list of code modules may be received, as in block 650. For example, the user interface provided by the device configuration service may enable the selection of the code modules from the list of code modules. The code modules may enable the hardware components to operate in the device. In other words, a specific code module may enable the operation of and/or an interface with a specific corresponding hardware component in the device.

The code modules may be provided for designing the device, as in block 660. For example, the device configuration service may provide the code modules to the user computing device, such as a laptop or a personal computer. The user computing device may generate a device image from the code modules, and then load the device image onto the device, such as the IoT device. The device image may be installed on the device, which may enable hardware components in the device to function correctly. In addition, a set of configuration parameters may be provided with the code modules. The set of configuration parameters may be selected based on the use case of the device, as indicated in the device capability definition, and the set of configuration parameters may be used when generating the device image.

Figure 7:
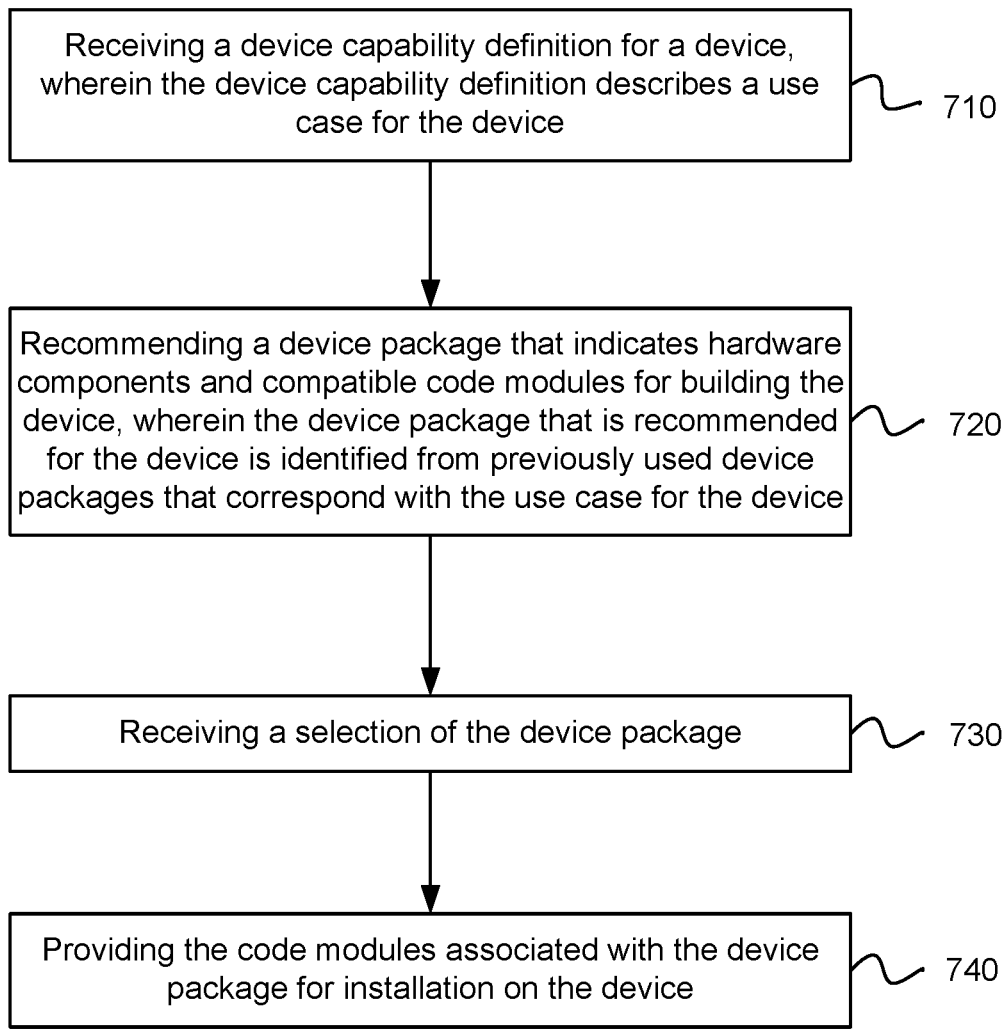
FIG. 7 is a flowchart of another example method for providing code modules.

FIG. 7 illustrates an example of a method for providing code modules for building devices (e.g., IoT devices). A device capability definition for a device may be received, as in block 710. For example, a device configuration service that operates in a service provider environment may provide a user interface that enables the device capability definition to be received. The device capability definition may describe a use case for the device. In other words, the device capability definition may define an intended use case for the device when the device is being designed.

A device package that indicates hardware components and compatible code modules may be recommended for building the device, as in block 720. The device configuration service may identify the device package that is recommended for the device from previously used device packages that correspond with the use case for the device, as indicated in the device capability definition. In other words, the device configuration service may identify device packages with similar use cases as compared to the device presently being designed, and the device configuration service may recommend the hardware components and compatible code modules that are associated with those device packages. The device configuration service may recommend device packages with hardware components and compatible software components having features or characteristics that are suitable for the device based on the device capability definition.

A selection of the device package may be received, as in block 730. For example, the user interface provided by the device configuration service may enable selection of the recommended device package by a user that is designing and building the device. By selecting the device package, the user may select the hardware components and compatible code modules that are associated with the device package. The code modules may enable the hardware components to operate in the device. In other words, a specific code module may enable the operation of and/or an interface with a specific corresponding hardware component in the device.

The code modules associated with the device package may be provided for download and installation on the device, as in block 740. For example, the device configuration service may provide the code modules to the user computing device, such as a laptop or a personal computer. The user computing device may generate a device image from the code modules, and then load the device image onto the device, such as the IoT device.

Figure 8:
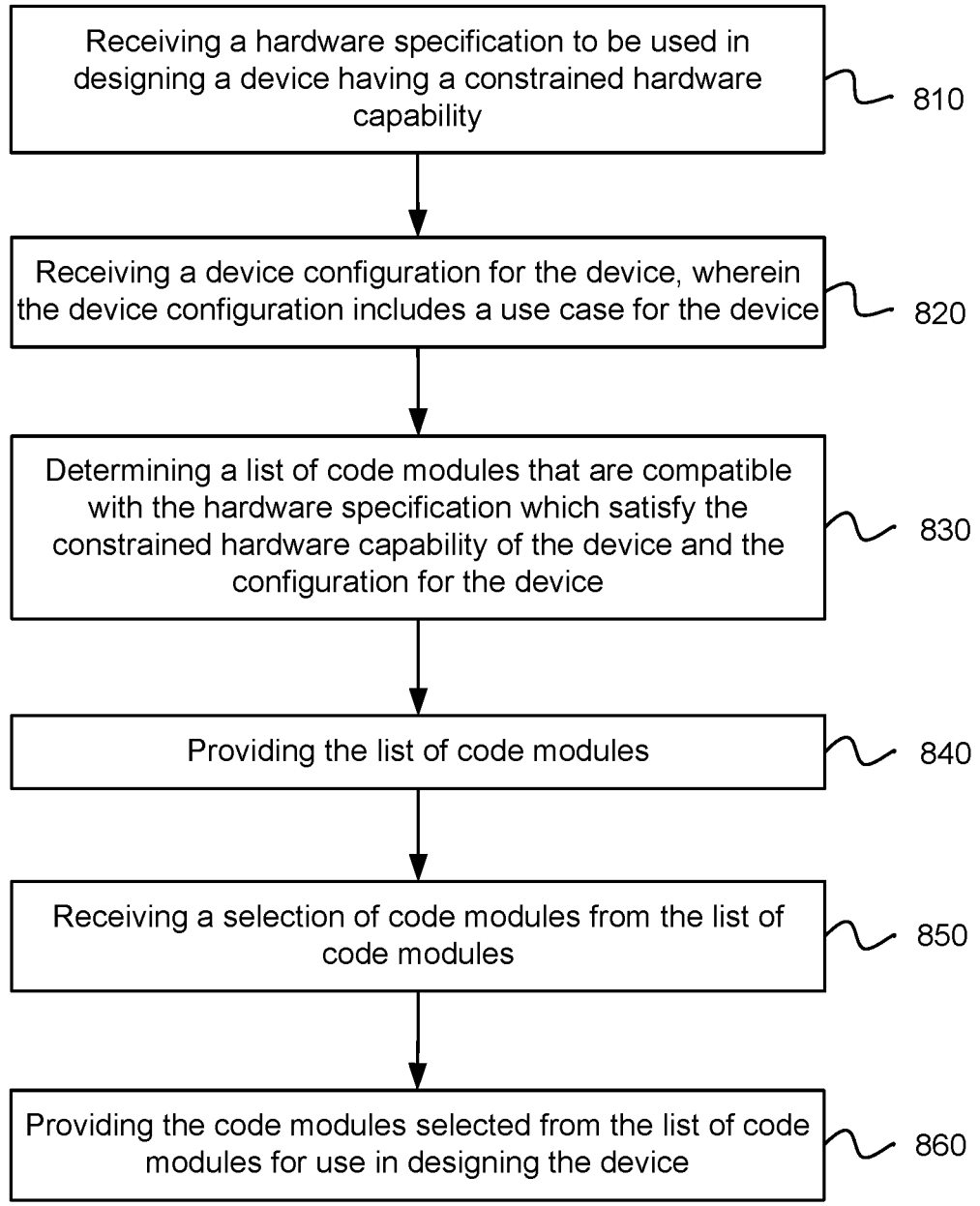
FIG. 8 is a flowchart of yet another example method for providing code modules.

FIG. 8 illustrates an example of a method for providing code modules for building devices (e.g., IoT devices). A hardware specification to be used in designing a device having a constrained hardware capability may be received, as in block 810. The hardware specification may define one or more hardware components to be used in the device that is being designed. In addition, the constrained hardware capability of the device may refer to a limited processing and memory capability of the device, as well as an absence of certain hardware capabilities for the device (e.g., an absence of a Wi-Fi capability, Bluetooth capability, digital signal processing (DSP) capability, etc.)

A device configuration may be received for the device, as in block 820. The device configuration may include a use case for the device. In addition, the device configuration may include input regarding code modules of interest to be loaded on the device. The use case may describe a particular purpose of the device or specific features to be attained by the device. The input regarding the code modules may be received from a user. For example, the input may describe particular code modules that are of interest to the user when designing the device.

A list of code modules may be determined that are compatible with the hardware specification which satisfy the constrained hardware capability of the device and the device configuration for the device, as in block 830. In other words, the list of code modules may be determined to include code modules that satisfy the constrained hardware capability of the device (e.g., code modules that do not consume more processing and memory than what is included in the device) and correspond with the device configuration for the device (e.g., the use case and/or the user input regarding code modules of interest), as well as being compatible with the hardware specification.

The list of code modules may be provided, as in block 840. For example, the list of code modules may be provided via a user interface. The code modules may include firmware, device drivers, executable code, libraries, configuration files, etc. A selection of code modules from the list of code modules may be received, as in block 850. The selection of the code modules may be received via the user interface. The code modules selected from the list of code modules may be provided for use in designing the device, as in block 860. For example, selected code modules may be used to generate a device image, and the device image may be loaded onto the device.

Figure 9:
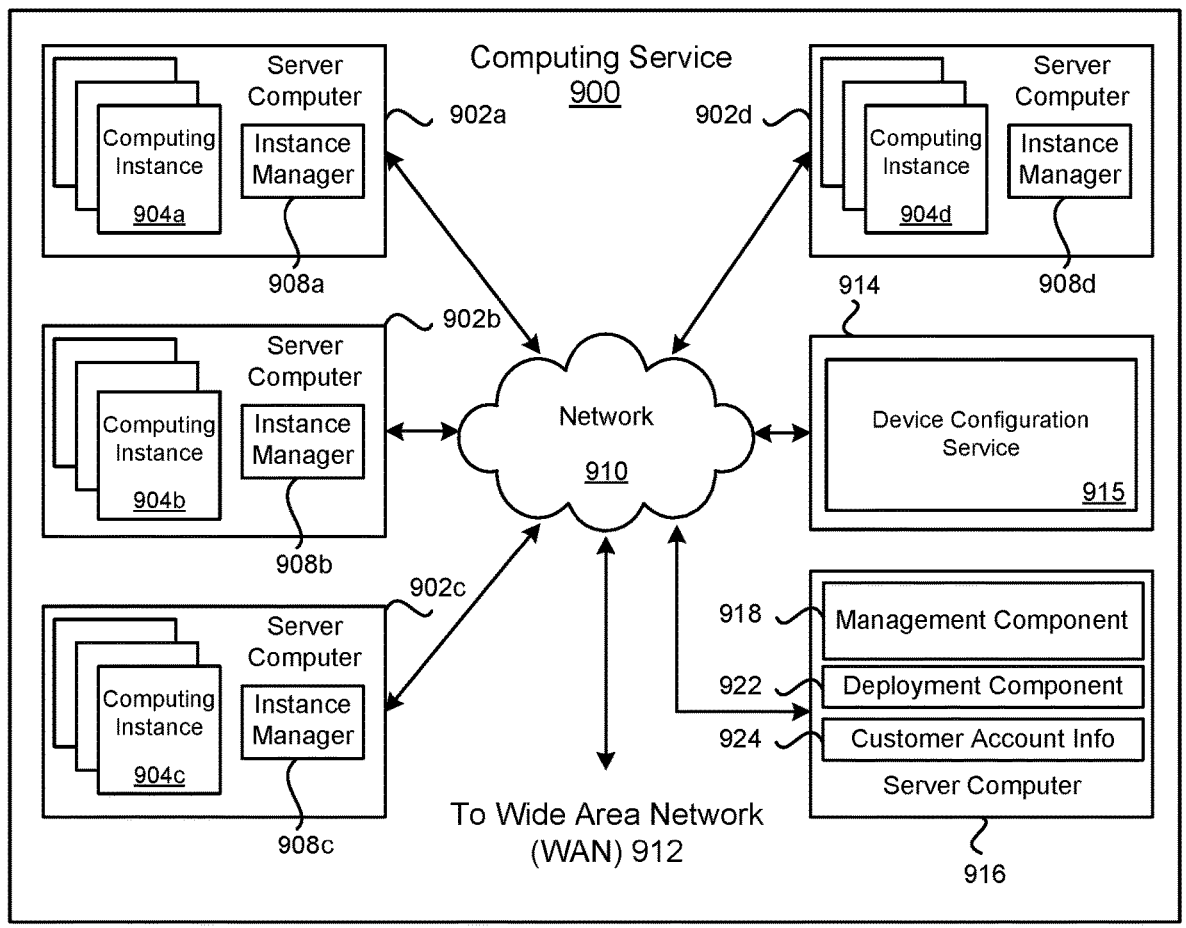
FIG. 9 is a block diagram of a service provider environment according to an example of the present technology.

FIG. 9 is a block diagram illustrating an example computing service 900 that may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904a-d.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS"), Platform as a Service ("PaaS"), and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine manager (VMM), or another type of program configured to enable the execution of multiple computing instances 904a-d on a single server. Additionally, each of the computing instances 904a-d may be configured to execute one or more applications.

A server 914 may be reserved to execute software components for implementing the present technology or managing the operation of the computing service 900 and the computing instances 904a-d. For example, the server computer 914 may execute a device configuration service 915. The device configuration service 915 may receive an indication of hardware components to be used when designing a device. The device configuration service 915 may provide a list of code modules that are compatible with the hardware components. The list of code modules may be based on the use case for the device. The device configuration service 915 may receive a selection of code modules from a list of code modules that are compatible with the hardware components selected from the list of hardware components. The device configuration service 915 may provide the code modules for use on the device.

A server computer 916 may execute a management component 918. A customer may access the management component 918 to configure various aspects of the operation of the computing instances 904a-d purchased by a customer. For example, the customer may setup computing instances 904a-d and make changes to the configuration of the computing instances 904a-d.

A deployment component 922 may be used to assist customers in the deployment of computing instances 904a-d. The deployment component 922 may have access to account information associated with the computing instances 904a-d, such as the name of an owner of the account, credit card information, country of the owner, etc. The deployment component 922 may receive a configuration from a customer that includes data describing how computing instances 904a-d may be configured. For example, the configuration may include an operating system, provide one or more applications to be installed in computing instances 904a-d, provide scripts and/or other types of code to be executed for configuring computing instances 904a-d, provide cache logic specifying how an application cache is to be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902a-d, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902a-d. The network topology illustrated in FIG. 9 has been simplified, as many more networks and networking devices may be utilized to interconnect the various computing systems disclosed herein.

Figure 10:
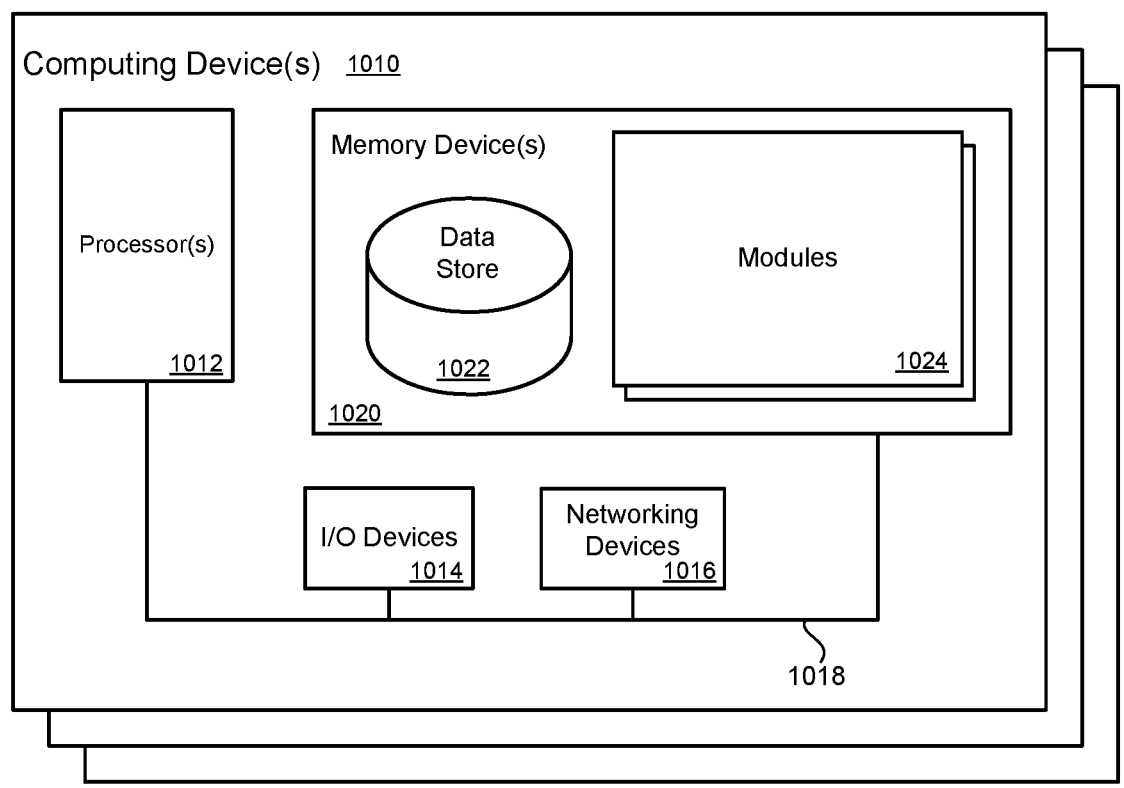
FIG. 10 is a block diagram that provides an example illustration of a computing device that may be employed in the present technology.

FIG. 10 illustrates a computing device 1010 on which modules or code components of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 or code components that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon that, when executed by one or more processors, cause the one or more processors to perform actions comprising:
   providing, from a device configuration service that operates in a service provider environment, a list of hardware components that are available when designing a device;
   receiving a selection of hardware components from the list of hardware components;
   receiving a device capability definition that defines a use case for the device;
   testing interfaces between code modules included in a plurality of code modules to ensure appropriate functionality for the plurality of code modules;
   providing a list of code modules from the plurality of code modules that are compatible with selected hardware components, wherein the list of code modules is filtered based on the use case for the device;
   receiving a selection of code modules from the list of code modules, wherein the selection of code modules enable the hardware components selected from the list of hardware components to operate in the device; and
   providing the selection of code modules for designing the device.

2. The non-transitory machine readable storage medium of claim 1, wherein the one or more processors further perform actions comprising:
   identifying a set of configuration parameters for the selection of code modules based in part on the use case for the device; and
   providing the set of configuration parameters with the selection of code modules.

3. The non-transitory machine readable storage medium of claim 1, wherein the one or more processors further perform actions comprising generating a dependency tree that automatically selects the code modules for use on the device.

4. A method, comprising:
   receiving a hardware specification to be used in designing a device having a constrained hardware capability;
   receiving a device configuration for the device, wherein the device configuration includes a use case for the device;
   testing interfaces between code modules included in a plurality of code modules to ensure appropriate functionality for the plurality of code modules;
   determining a list of code modules from the plurality of code modules that are compatible with the hardware specification which satisfy the constrained hardware capability of the device and the device configuration including the use case for the device;
   providing the list of code modules;
   receiving a selection of code modules from the list of code modules; and
   providing the code modules selected from the selection of code modules for use in designing the device.

5. The method of claim 4, further comprising:
   generating a device image that includes the code modules selected using a device image build service in a service provider environment; and
   providing the device image for delivery and installation on the device.

6. The method of claim 4, further comprising receiving a device capability definition that defines the device configuration for the device, wherein the device configuration further includes an input regarding code modules of interest to be loaded on the device.

7. The method of claim 4, wherein the code modules to be used on the device are compatible with a real-time operating system (RTOS) that executes on the device.

8. The method of claim 4, further comprising providing a user interface that enables the selection of the code modules to be used on the device.

9. The method of claim 4, further comprising:
   creating a supplementary device image from the code modules selected from the list of code modules, wherein the supplementary device image is uploaded to an update service that operates in a service provider environment; and
   providing, from the update service, the supplementary device image as an update to install on the device, wherein the supplementary device image augments a capability of a previously received device image for the device.

10. The method of claim 4, further comprising:
modifying a set of configuration parameters for the code modules based in part on the device configuration for the device; and
providing the set of configuration parameters with the code modules.

11. The method of claim 4, further comprising providing the code modules from a device configuration service that operates in a service provider environment.

12. The method of claim 4, further comprising generating a dependency tree that automatically selects the code modules for use on the device in accordance with software dependencies defined in the dependency tree.

13. The method of claim 4, wherein the code modules for the device include one or more of: a microcontroller module, a digital signal processing (DSP) module, a communication module, a sensor module, a camera module, a transceiver module or a power management module.

14. A system, comprising:
at least one processor;
at least one memory device including a data store to store a plurality of data and instructions that, when executed, cause the system to:
receive a device capability definition for a device, wherein the device capability definition describes a use case for the device;
recommend a device package that indicates hardware components and compatible code modules for building the device, wherein the device package that is recommended for the device is identified from previously used device packages that correspond with the use case for the device, and interfaces between code modules included in a plurality of code modules is tested to ensure appropriate functionality for the plurality of code modules;
receive a selection of the device package; and
provide the compatible code modules associated with the device package for use on the device.

15. The system of claim 14, wherein the plurality of data and instructions, when executed, cause the system to:
receive a selection of the device package with a request for an alternate code module that is not associated with the device package; and
provide the alternate code module for use in designing the device.

16. The system of claim 14, wherein the plurality of data and instructions, when executed, cause the system to provide the code modules to enable a device image to be generated from the code modules and installed on the device.

17. The system of claim 14, wherein the plurality of data and instructions, when executed, cause the system to:
receive, at a device configuration service that operates in a service provider environment, a selection of a supplemental code module for the device;
provide the supplemental code module for use on the device, wherein the supplemental code module is used to create a supplemental device image that is uploaded to an update service that operates in the service provider environment; and
provide, from the update service, the supplemental device image as an update to install on the device, wherein the supplementary device image augments a capability of a previously received device image for the device.

18. The system of claim 14, wherein the plurality of data and instructions, when executed, cause the system to:
identify a set of configuration parameters for the code modules based in part on the use case for the device; and
provide the set of configuration parameters with the code modules.

19. The system of claim 14, wherein the plurality of data and instructions, when executed, cause the system to provide a user interface that enables the selection of the device package.

20. The system of claim 14, wherein the plurality of data and instructions, when executed, cause the system to generate a dependency tree that automatically selects the code modules for use on the device in accordance with software dependencies defined in the dependency tree.

* * * * *